United States Patent Office 3,323,761
Patented June 6, 1967

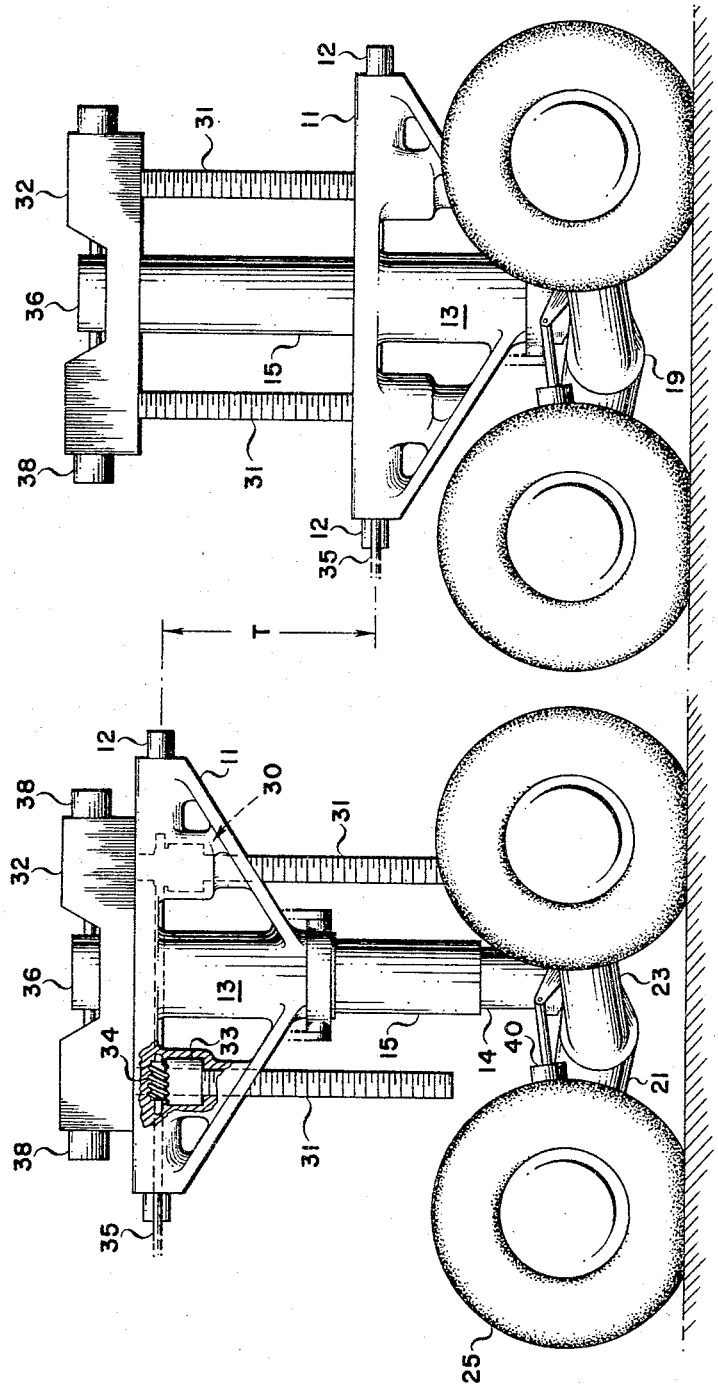

3,323,761
RETRACTABLE UNDERCARRIAGE FOR AIRCRAFT
John E. Copeland, Dunwoody, and Frederic A. Matthews, Atlanta, Ga., assignors to Lockheed Aircraft Corporation, Burbank, Calif.
Filed Sept. 13, 1965, Ser. No. 486,655
11 Claims. (Cl. 244—102)

This invention relates broadly to undercarriages commonly employed to support and move aircraft over ground surfaces and which are retractable into the aircraft during flight, and more particularly to such an undercarriage especially designed for relatively heavy aircraft to facilitate the landing, takeoff and ground movement thereof on and over unimproved or modestly improved terrain.

In present day operations the landing and takeoff of aircraft is not restricted to ideal airports having paved and reinforced runways constructed for the purpose. It is often required that aircraft land on and take off from hastily prepared airstrips and even totally unimproved terrain in which case the undercarriage becomes critical. To successfully negotiate such an operation, the ground contacting elements, usually wheels, cannot be allowed to sink into the surface to the extent that the resistance to wheel movement or drag becomes excessive. Even with improved runways the size and weight of aircraft, particularly cargo-carrying aircraft and transports, has increased to the point that the paved runway surfaces of some existing air fields are inadequate to accommodate these aircraft.

In order to meet and satisfy this situation, the ground contacting elements of undercarriages have been spread out so as to distribute the weight of the aircraft over a larger surface area. With the increase in size and weight of aircraft, this involves multiple, spaced wheels on each landing gear unit complicating the stowage of such units within the aircraft when retracted during flight.

Moreover, the arrangement or relative location of the multiple wheels when the landing gear is extended or protracted is important in that even though the wheels are spaced to fairly distribute the aircraft weight they may still present problems on unimproved terrain. Thus, the alignment of successive wheels should not be such as to rut or channel relatively soft terrain in an excessive manner or to unduly interfere with the operation and performance of ensuing wheels in the same or approximately the same path of movement.

The present invention is therefore directed to improvements in the aircraft undercarriage art whereby the above and related considerations are incorporated into an operating structure. To this end a landing gear unit or assembly is herein proposed that comprises multiple wheels organized and arranged to give maximum flotation (i.e., optimum tire load/pressure distribution) over a surface when the gear is protracted that is compatible with optimum stowage area when retracted into the aircraft. This includes means to pre-position the multiple wheels during both retraction and protraction to their proper relative positions. As an added feature, adjustable means is provided as a part of the landing gear assembly to raise and lower the aircraft with respect to the ground surface facilitating the ground operations of the aircraft.

With the above and other objects in view as will be apparent, this invention consists in the construction, combination and arrangement of parts all as hereinafter more fully described, claimed and illustrated in the accompanying drawings wherein:

FIGURE 5 is a side elevation of the landing gear assembly shown relative to the forward direction of the aircraft and in the fully protracted, ground contacting position corresponding to that illustrated in FIGURES 1 and 2;

FIGURE 6 is a similar view showing an adjusted position of the landing gear assembly indicating a lower position of the aircraft with respect to the ground or supporting surface; and FIGURE 7 is a general schematic of alternate drive means for relative movement of the wheels to and from their extreme positions corresponding to the protraction and retraction.

Figure 1:
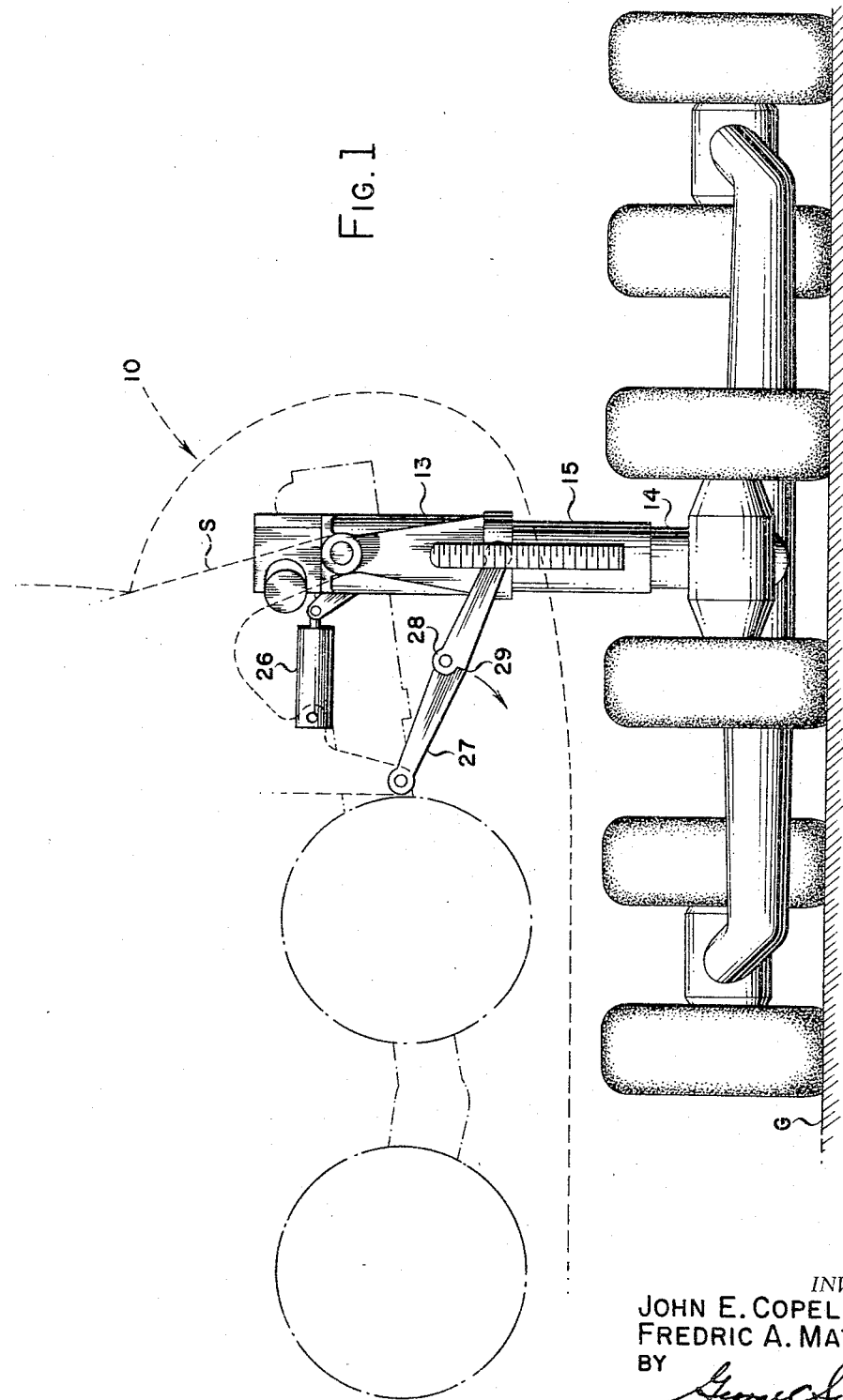
FIGURE 1 is a front view in broken outline of a portion of an aircraft illustrating a landing gear unit constructed and arranged in accordance with the teachings hereof located in the protracted or "down" position to show the arrangement and disposition of the several wheels that comprise each assembly or bogey, the retracted or "up" position thereof being shown in phantom.

Referring more particularly to the drawings, 10 designates a component of the aircraft with which one of the landing gear assemblies is associated and in which it is adapted to be stowed when retracted. To this end the landing gear assembly is formed by a structural support or yoke 11 that terminates at opposite ends in trunnions 12 adapted to be pivotally engaged in complementary sockets carried by and constituting an integral part of the aircraft structure. Centrally, the yoke 11 is formed with an integral cylindrical collar 13 that extends perpendicularly therefrom and in which a conventional oleo strut comprising generally a pair of telescoping cylinders 14 and 15 is slidably mounted.

At its outer end the inner cylinder 14 is adapted to connect and mount in universal engagement a bogey on which the aircraft is supported during ground operations. More specifically, the cylinder 14 terminates in a fork 16 adapted to straddle a shaft 17 rotatably mounted in a pair of spaced ears 18 integrally formed on and projecting at right angles from a beam 19 at the center thereof. The shaft 17 is pivotally connected centrally as at 20 to the fork 16 whereby the strut 14, 15 is rotatable in two degrees of freedom relative to the beam 19. Conventional means, such as for example one or more dampers or snubbers or the like, may be employed between the strut 14, 15 and beam 19 to normally maintain them in a relatively perpendicular position.

The beam 19 is formed or otherwise provided with three equally spaced arms 21, 22 and 23 symmetrically disposed around the longitudinal center line Y of the oleo strut 14, 15. The arm 21 is laterally disposed in a forward direction at the center thereof and the arms 22 and 23 are laterally disposed in an aft direction at the ends thereof when the assembly is protracted and in the load-supporting position. Each of the arms 21, 22 and 23 terminates in a perpendicular axle stud 24 that extends beyond the opposite ends thereof and on each end of which a ground engaging element or wheel 25 is rotatably mounted.

Power means in the form of a pair of parallel hydraulic cylinders 26 connected at one of their ends to the yoke 11 and at their other ends to stationary aircraft structure S serves to rotate the landing gear assembly as described about an axis X on the trunnions 12 to and from the retracted and protracted positions. In the protracted position the several wheels 25 are all adapted to contact the supporting or ground surface G and constantly maintain such contact due to the universal freedom of movement of the beam 19 through its mount 16. Thus disposed the several wheels 25 are located in separate parallel planes with each pair thereof symmetrical about the supported load through the oleo strut 14, 15 and defining a generally triangular area of maximum load distribution with minimum aggregate axial length of the several wheels 25.

In order to additionally support the landing gear assembly in its protracted or load-carrying position, a pair of side braces 27 is provided between fixed structure S of the aircraft and the yoke 11. These braces 27 are pivotally connected at their opposed corresponding ends to the opposite sides of the collar 13 adjacent its outer or lower end and to the aircraft inboard thereof. At its center each brace 27 is hinged as at 28 with lock means such as abutting stops 29 to limit the hinged movement thereof when the gear assembly is disposed in its fully protracted position.

In the protracted or load-carrying position, the effective length of the oleo strut 14, 15 is adjusted by means of and through a pair of power jacks 30 connected to the yoke 11 and disposed equidistant on either side of and parallel to the strut 14, 15. These jacks 30 each comprise a standard ball screw 31 immovably connected to and projecting at right angles from each outer end of a plate 32 located on one side of the yoke 11 in opposition to the wheels 25. The plate 32 constitutes an integral, lateral extension on the outer cylinder 15 and defines a face that is disposed in a plane parallel to the adjacent face of the yoke 11 with which it abuts when brought together therewith.

Each screw 31 passes through the yoke 11 which is provided with an opening therefor and in which a standard externally threaded nut 33 is mounted for engagement and coaction therewith. A worm gear 34 in constant mesh with the external threads of nut 33 is driven by suitable power means (not shown) through a shaft 35 that passes concentrically through the adjacent trunnion 12. A common shaft 35 may be employed to drive the worm gear 34 associated with each ball screw 31.

The end of the cylinder 14 remote from the mount 16 extends into the outer cylinder 15 where it is splined to an extension that passes through the plate 32 terminating beyond the surface of the plate 32 where it is secured to a laterally projecting lever 36 through a suitable interlocking connection 37. The position of the plate 32 is thus related to the bogey beam 19 and attached wheels 25 so that operation of the screw jacks 30 as described effects a relative movement of the yoke 11 with respect thereto. When the landing gear assembly is in the protracted or load-supporting position, this results in a raising and lowering of the aircraft relative to the supporting surface G, as indicated by the arrow T. In cargo-carrying aircraft this adjustment facilitates the loading and unloading opertion by positioning the cargo compartment relative to particular cargo-feeding and -receiving surfaces.

At its outer end the lever 36 pivotally connects the free ends of a pair of actuators 38 the opposite end of each of which is anchored through a pivotal connection 39 to the associated outer end of the plate 32. Each actuator 38 comprises an extensible and contractible unit powered in any conventional manner with the anchored ends 39 thereof remote so that the operation thereof in unison and opposition is effective in the same direction with respect to the rotation of the lever 36. Thus, the bogey beam 19 and the wheels 25 are rotated about the longitudinal center line Y of the oleo strut 14, 15.

A pair of similar actuators 40 is associated with the arm 21 of the bogey beam 19 for the rotation thereof relative to the strut 14, 15. For this purpose a laterally disposed lever or crank 41 is keyed or otherwise secured to the outer end of each trunnion 17 to pivotally connect at its free end the movable end of one of the actuators 40. The fixed end of each actuator 40 is connected to the axle 24 of the associated, forward wheels 25 of the bogey. Thus, upon operation of the actuators 40 in unison through any conventional power means the entire bogey beam 19 is rotated relative to the strut 14, 15 on the trunnions 17.

In view of the foregoing construction and arrangement, retraction and protraction of the gear assembly is effected by the sequential operation of the several actuators 38, 40 and 26 whereby the beam 19 is rotated about the axis Y, the trunnions 17 and the axis X, respectively. The beam 19 is thereby moved to and from positions at right angles to the yoke 11, corresponding to the protracted position and parallel to the yoke, corresponding to the retracted position. At the same time the plane of the axes of the forward and aft wheels 25 is moved to and from a location perpendicular to the strut 14, 15 corresponding to the protracted position and a location substantially parallel to the strut 14, 15 corresponding to the retracted position.

FIGURE 7 shows an alternate drive for the rotation of the bogey beam 19 relative to the strut 14, 15 whereby the axis of the forward wheels 25 may be, if desired, disposed in axial alignment with the axis of the aft wheels 25 in the retracted position. This offers the further advantage of an even more compact bogey assembly in the retracted position within the aircraft.

In this case an arm 21a carrying the forward wheels 25 is rotatably mounted on the bogey beam 19 in any conventional manner and a lever 41a is carried by and projects laterally from the beam 19. A collar 42 having a radial extension 43 is rotatably mounted on the beam 19 between the arm 21a and the lever 41a. One of the actuators 40a is connected between outer end of the lever 41a and the inner end of the extension 43 while the other actuator 40a is connected between the outer end of the extension 43 and a lug 21' formed on and projecting laterally from the arm 21a adjacent its inner end. Thus, upon operation of the actuators 40a the arm 21a and its attached wheels 25 are rotated approximately 180° about the beam 19. Upon the extension of the actuators 40a, the axis F of the forward wheels 25 is thereby located coaxially with the axis A of the aft wheels 25 corresponding to the retracted position of the bogey assembly. On the other hand, when the actuators 40a are contracted, the axis F of the forward wheels 25 is thereby displaced laterally with respect to the axis A of the aft wheels 25 corresponding to the protracted position of the bogey assembly.

Figure 2:
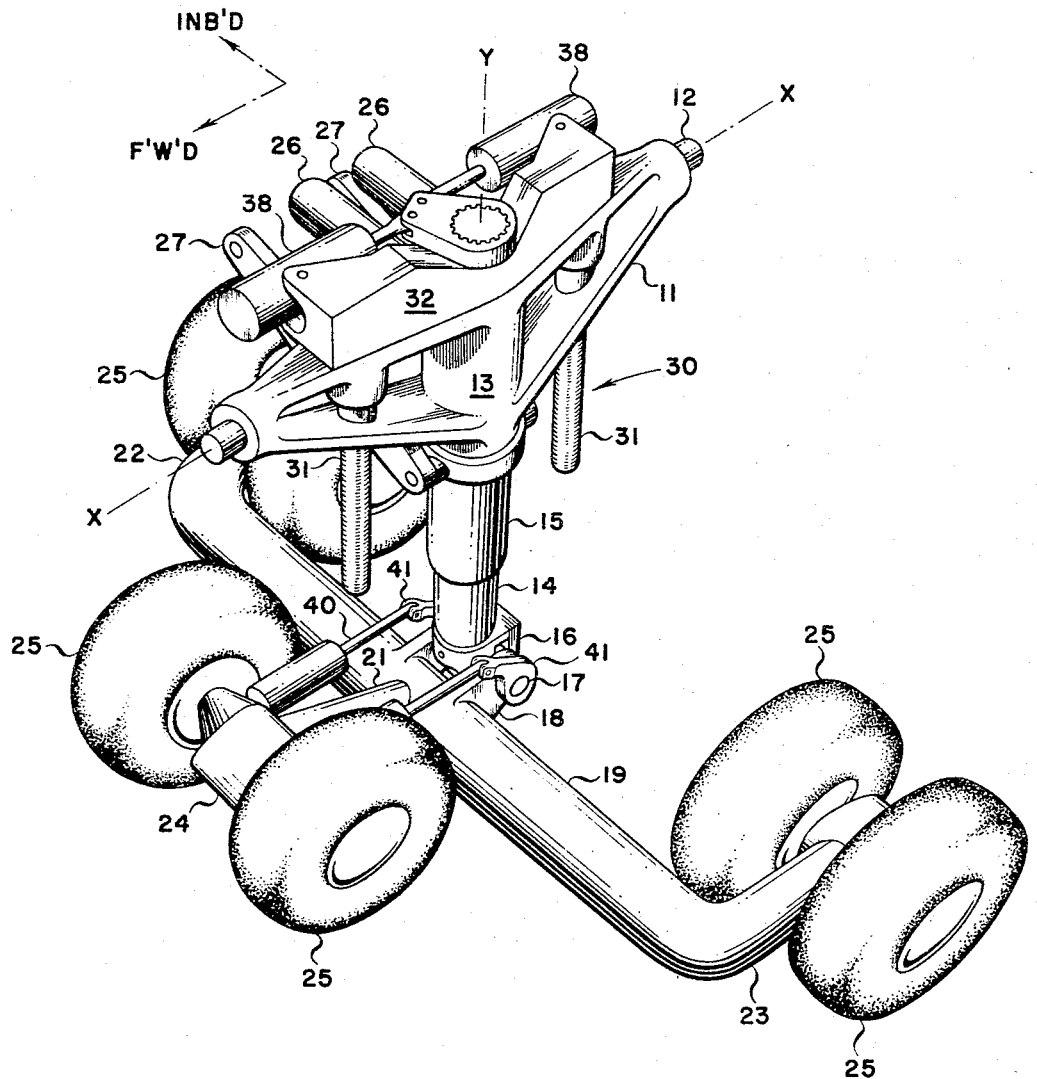
FIGURE 2 is an isometric view of the landing gear assembly in the same position indicating the relative position of the aircraft on which it is mounted as well as the axes of rotation of the assembly when moving to and from its retracted position.
Figure 3:
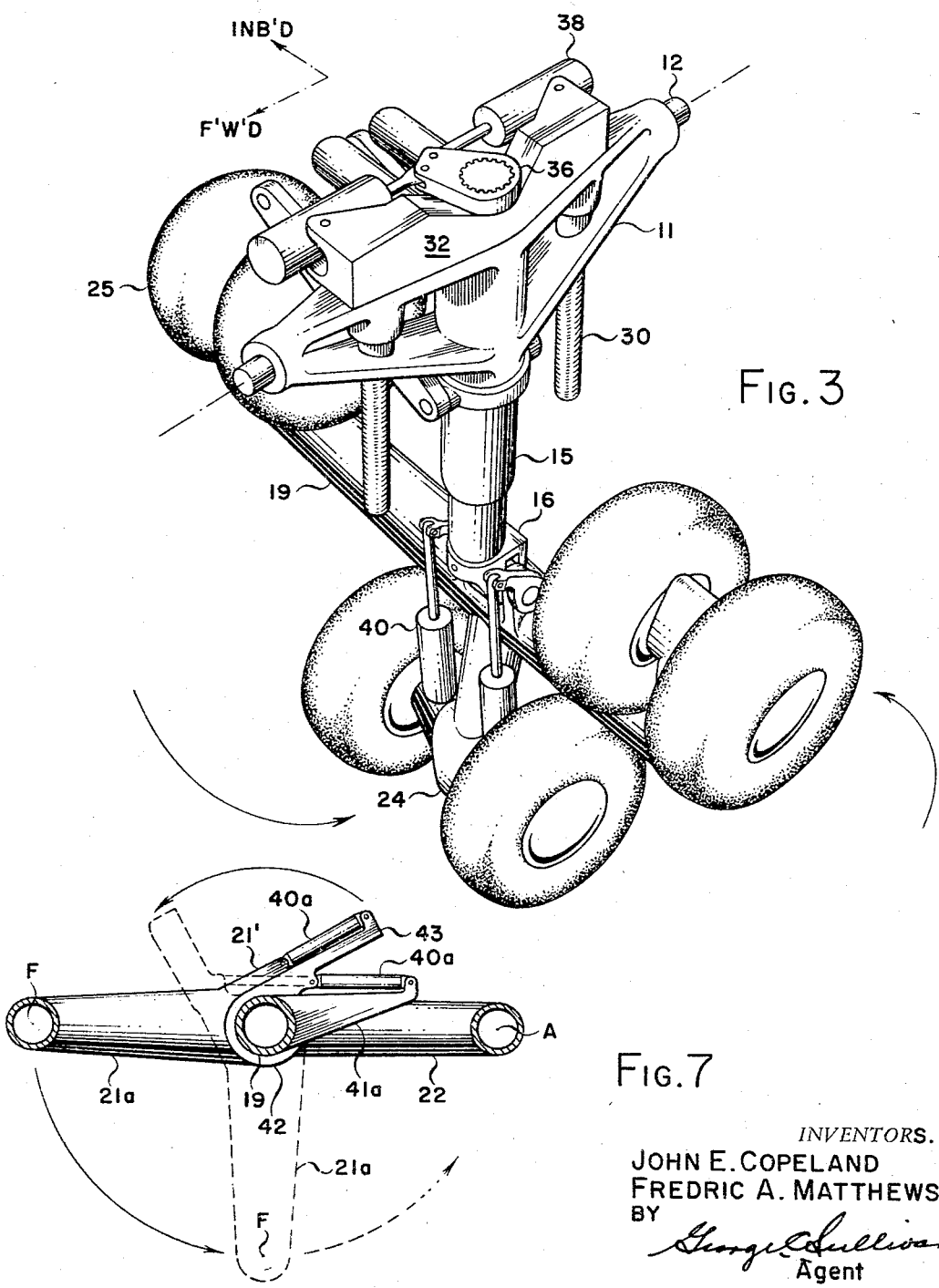
FIGURE 3 is a similar view showing the relative position of the several wheels with reference to their common support on its oleo strut for retraction.
Figure 4:
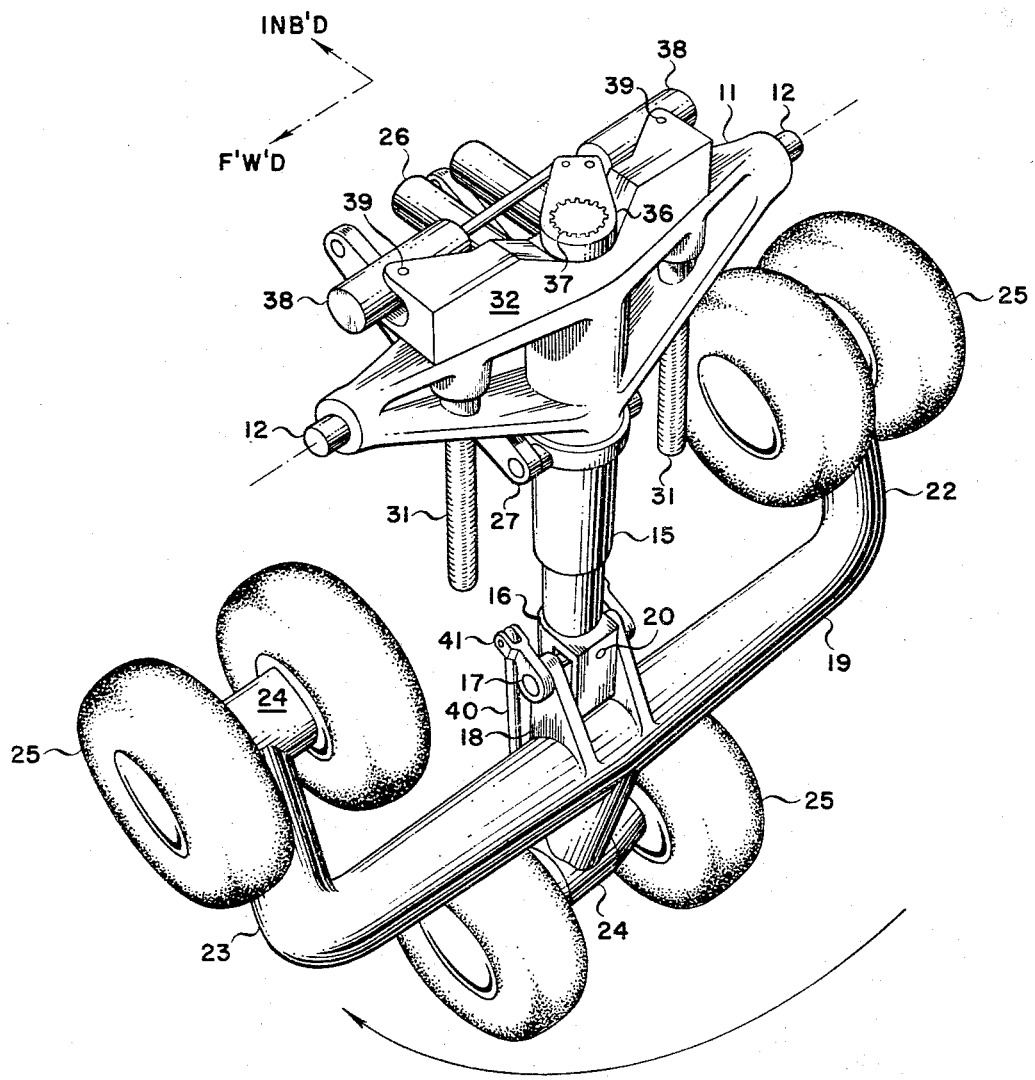
FIGURE 4 is a similar view showing the position of the several wheels on their common support after the rotation thereof about the strut axis from the position corresponding to full protraction to the position corresponding to full retraction.

In either case, i.e., with the actuating arrangement shown in FIGURES 2 through 4 or the alternate arrangement shown in FIGURE 7, the several wheels 25 when the bogey is disposed in the protracted position define a generally triangular area of contact with the ground G, an area of maximum load distribution. When retracted these wheels 25 are displaced to occupy a shallow effective area, requiring optimum stowage area therefor within the aircraft.

While a particular embodiment of the invention has been hereinabove illustrated and described, various innovations and modifications will be apparent to those skilled in the art without departing from the invention. The appended claims are intended to cover all such modifications and equivalents that fall within the true spirit and scope of this invention and constitute the only limitations thereto.

What is claimed is:

1. A retractable undercarriage for aircraft comprising a strut pivotally mounted on said aircraft to swing relative thereto to and from extreme positions of protraction and retraction, a bogey mounted for universal movement on the outer end of said strut, a plurality of symmetrically disposed ground engaging elements carried by said bogey and disposed about multiple transverse centers with each element disposed in a different longitudinal plane, and power means operative on said bogey for the rotation thereof relative to said strut for the displacement of said centers approximately 90° from their location in each extreme position aforesaid.

2. The undercarriage of claim 1 wherein said power means includes a drive to dispose and maintain said centers in a plane substantially perpendicular to said strut in the protracted position and in a plane substantially parallel to said strut in the retracted position.

3. The undercarriage of claim 1 including adjustable means to establish and maintain the effective length of said strut.

4. The undercarriage of claim 1 wherein said strut is slidably mounted in a yoke for linear movement relative thereto while swinging in unison therewith to and from the extreme positions aforesaid.

5. The undercarriage of claim 1 wherein said bogey includes a beam, a mount pivotally connected to said beam at the center thereof, and a pivotal connection at right angles to the pivot of said mount betwen said strut and said mount.

6. The undercarriage of claim 1 wherein said ground engaging elements are arranged in pairs defining a generally triangular area of contact with a supporting surface when disposed in the protracted position.

7. The undercarriage of claim 5 including three integral arms extending from said beam and symmetrically arranged relative to said strut, at least one of said ground engaging elements being carried by each of said arms.

8. The undercarriage of claim 4 wherein said yoke includes a pair of trunnions adapted to pivotally connect to stationary structure of said aircraft, and said strut is connected in torque transfer relation to said power means.

9. The undercarriage of claim 8 including at least one side brace connected between said stationary structure and said yoke and releasable means to secure and maintain each said side brace rigid when the strut is disposed in the protracted position aforesaid.

10. A retractable undercarriage for aircraft comprising:
 a strut pivotally mounted on said aircraft to swing relative thereto to and from extreme positions of protraction and retraction;
 a bogey beam perpendicular to said strut;
 a lateral projection carried by said beam at the center thereof;
 a universal connection between the outer ends of said strut and said projection;
 a plurality of ground contacting wheels on said beam symmetrically arranged about said strut with each said wheel in a different longitudinal plane; and
 power means operative on said wheels for the relative movement thereof for the displacement of their centers approximately 180° from their location in each extreme position aforesaid.

11. The undercarriage of claim 10 wherein said power means includes a drive connected between said wheels and said beam for the relative rotation thereof to and from positions with said wheels disposed with their centers laterally displaced corresponding to the protracted position aforesaid and with their centers axially aligned corresponding to the retracted position aforesaid.

References Cited
UNITED STATES PATENTS 3,261,574 7/1966 Bowdy _____ 244—102
3,262,592 7/1966 Mannon _____ 280—81 X

OTHER REFERENCES

Plattner, C. M.: Aviation Week and Space Technology, Apr. 26, 1965, TL 501 A8, pages 52–62.

MILTON BUCHLER, *Primary Examiner.*

P. E. SAUBERER, *Assistant Examiner.*